J. C. DREW.
LIFTING ATTACHMENT FOR AUTOMOBILES.
APPLICATION FILED DEC. 4, 1917.

1,268,101. Patented June 4, 1918.

J. C. Drew, Inventor

UNITED STATES PATENT OFFICE.

JAMES C. DREW, OF NEW ORLEANS, LOUISIANA.

LIFTING ATTACHMENT FOR AUTOMOBILES.

1,268,101.  Specification of Letters Patent.  Patented June 4, 1918.

Application filed December 4, 1917. Serial No. 205,366.

*To all whom it may concern:*

Be it known that I, JAMES C. DREW, a citizen of the United States, residing at New Orleans, in the parish of Orleans and State of Louisiana, have invented a new and useful Lifting Attachment for Automobiles, of which the following is a specification.

This invention relates to an attachment for automobiles whereby the machine to which the attachment is applied can be caused to lift off of the ground when given a short rearward movement, it being possible, by using two of these attachments upon the rear axle, to bodily lift the rear portion of the automobile so that the tires will be supported off of the ground.

Another object is to provide an attachment which can be applied readily to the axle of an automobile and will normally be supported out of active position.

A further object is to provide an attachment which can be quickly brought into position to lift the automobile.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings—

Figure 1:
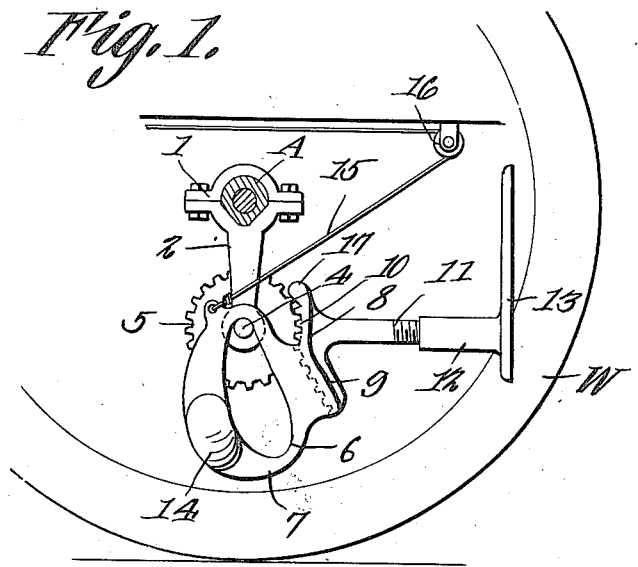
Figure 1 is a side elevation of the attachment applied to a vehicle, the rear axle being shown in section and said attachment being shown elevated out of active position.

Referring to the figures by characters of reference A designates a portion of the rear axle of a motor vehicle and clamped upon this axle is a split collar 1 provided at the upper end of a hanger 2. A lower end of the hanger is forked as shown at 3 and extending through the lower end of the hanger is a pin 4 on which is journaled a gear 5, this gear being extended into the forked portion of the hanger as shown particularly in Fig. 2. The end of the pin 4 projects laterally beyond the forked end of the hanger and extends into substantially oval slots 6 formed within wings 7 which extend past the sides of the hanger 2 and are formed integral with and extend from the sides of the head 8 of the lifting member. This head has an inclined portion 9 extending through a portion 10 which is disposed approximately at right angles to the longitudinal center of the support. A stem 11 projects from the head 8 and is adjustably attached to the base 12 which has a foot 13 extending rearwardly therefrom and adapted, under active conditions, to rest upon the ground or other supporting surface. Those portions of the wings 7 remote from head 8 are preferably made heavy as shown at 14, thus to constitute counterbalances or weights whereby, when the ends of the pin 4 are seated in the small ends of the slots, the base 12 and its foot 13 will be held elevated as shown particularly in Fig. 1. An operating cord or chain 15 is connected to one or both of the wings 7 close to the small ends of the slots 6, this flexible element being extended into engagement with a guide pulley 16 located in rear of the axle A and then extended forwardly to a point where it can be reached by the driver and operated.

Figure 3:
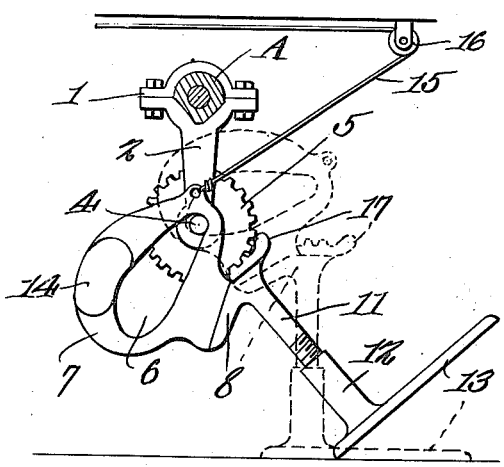
Fig. 3 is a side elevation showing, in full and dotted lines, two positions of the attachment while being brought to active position.
Figure 4:
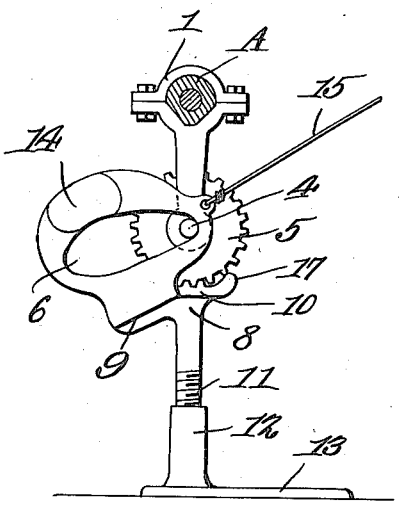
Fig. 4 is a view showing the attachment supporting the axle in raised position.

Assuming that one of the attachments is connected to the axle A close to one of the rear supporting wheels W of a motor vehicle, the attachment being in the position shown in Fig. 1, the wheel W adjacent the attachment can be raised from the ground as follows:

The operator pulls on the flexible member 15. This will result in swinging the attachment about the pin 4 as a center until the forward end of the foot 13 comes against the ground as shown in full lines in Fig. 3. The operator then continues to pull on the connection 15 whereupon the attachment will be swung forwardly relative to the pin 4 and the foot 13 will assume a flat position on the ground with the parts located as shown by dotted lines in Fig. 3. With the parts thus held the motor vehicle is given an abrupt short movement in a rearward direction which will cause the gear 5 to come against and to travel upwardly along the inclined portion 9 of the head 8, the momentum being sufficient to cause the necessary upward and rearward movement to bring the gear 5 ultimately upon the highest portion 10 of the head 8 where the gear 5 will remain, this gear arriving upon this high portion 10 just after the tire moves out of contact with the ground. It is to be understood of course that rack teeth are provided on the portions 9 and 10 of the head 8 and any suitable means, such as an enlarged tooth or ear may be provided for preventing the gear 5 from riding over and past the portion 10.

Figure 2:
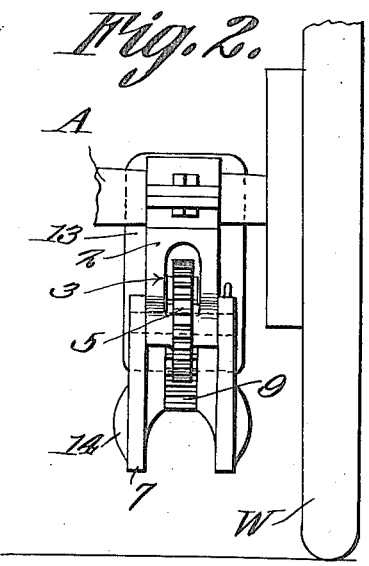
Fig. 2 is a front elevation of the structure shown in Fig. 1.

The wheel W can be lowered to the ground simply by pushing the machine forwardly so that the gear 5 will roll off of the head 8 whereupon the weight 14 will swing the attachment back to the position shown in Fig. 1.

Instead of having one of these lifting attachments on the machine, two can be provided on the rear axle, one adjacent each wheel so that by using either one of these attachments in the manner described, either one of the wheels can be raised and, by using both of the attachments both wheels can be raised, the momentum being sufficient to cause both wheels to lift off of the ground when the machine is driven rearwardly up the inclines 9. Likewise two additional attachments can be arranged on the front axle with the result that when the machine is given the short rearward movement described, all four wheels will lift off of the ground.

If desired the working parts of each attachment can be mounted within a suitable housing so that they will be protected from dust, etc. Such a structure is so obvious, however, that it is not deemed necessary to illustrate it.

What is claimed is—

1. A lifting attachment for automobiles, including a freely revoluble gear, means for connecting the same to the axle of a motor vehicle, a base, a head connected thereto and having a rack including an inclined end portion, slotted wings, pivotally and slidably mounted relative to the gear, said rack being constantly engaged by the gear, the wings constituting weights for holding the base normally elevated out of contact with the ground, and means under control of the driver for swinging the base against the action of the weights to position said base upon the ground and under the gear with the inclined portion of the rack back of but in the path of the gear.

2. The combination with a hanger and a gear mounted to rotate freely in the hanger, of a base, a head connected to the base and having a rack including an inclined end portion, slotted wings extending from the head and across the sides of the hanger, means projecting from the hanger and into the slot for holding the wings in pivotal and slidable engagement with the hanger, said wings constituting means for holding the base normally elevated, and means under the control of the driver for swinging and sliding the wings relative to the hanger to bring the base into contact with the ground and to bring the inclined rack back of and in the path of the gear.

In testimony that I claim the foregoing as my own, I have hereto affixed my signature in the presence of two witnesses.

JAMES C. DREW.

Witnesses:
J. DAVID WALKER,
J. E. DUFFEL.